US009568795B2

(12) United States Patent
Nakamura et al.

(10) Patent No.: US 9,568,795 B2
(45) Date of Patent: Feb. 14, 2017

(54) LIQUID CRYSTAL DISPLAY DEVICE

(71) Applicant: Japan Display Inc., Tokyo (JP)

(72) Inventors: Takao Nakamura, Mobara (JP); Kazuki Ishii, Sakura (JP); Daisuke Mutou, Mobara (JP); Hidenori Seki, Chiba (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/746,102

(22) Filed: Jul. 7, 2015

(65) Prior Publication Data

US 2016/0011478 A1 Jan. 14, 2016

Related U.S. Application Data

(63) Continuation of application No. 14/056,545, filed on Oct. 17, 2013, now Pat. No. 9,170,463, which is a
(Continued)

(30) Foreign Application Priority Data

Dec. 15, 2010 (JP) ................................. 2010-279155

(51) Int. Cl.
*G02F 1/1362* (2006.01)
*G02F 1/1333* (2006.01)
(Continued)

(52) U.S. Cl.
CPC ....... *G02F 1/136286* (2013.01); *G02F 1/1368* (2013.01); *G02F 1/133345* (2013.01);
(Continued)

(58) Field of Classification Search
CPC ................................................ G02F 1/136286
See application file for complete search history.

(56) References Cited

U.S. PATENT DOCUMENTS 5,731,856 A * 3/1998 Kim ...................... G02F 1/1345
349/147
8,593,596 B2 11/2013 Kunimatsu et al.
(Continued)

FOREIGN PATENT DOCUMENTS

CN 101855663 A 10/2010
JP H5-121570 A 5/1993
(Continued)

OTHER PUBLICATIONS

Office Action dated Mar. 31, 2014 regarding a counterpart Chinese patent application No. 201110430612.0.
(Continued)

*Primary Examiner* — John P Dulka
*Assistant Examiner* — Christina Sylvia
(74) *Attorney, Agent, or Firm* — TYPHA IP LLC

(57) ABSTRACT

In a liquid crystal display device that uses a TFT, a contact hole is formed to connect an image signal line. An organic film is formed so as to cover the image signal line, and a common electrode, which is a transparent electrode, is formed on the organic film. An interlayer insulating film is formed on the common electrode. A through hole is formed in the interlayer insulating film, and the diameter of the through hole is greater than the diameter of the contact hole.

10 Claims, 7 Drawing Sheets

Related U.S. Application Data continuation of application No. 13/311,595, filed on Dec. 6, 2011, now Pat. No. 8,563,982.

(51) Int. Cl.
  *G02F 1/1343* (2006.01)
  *G02F 1/1368* (2006.01)
(52) U.S. Cl.
  CPC .. *G02F 1/134363* (2013.01); *G02F 1/136227* (2013.01); *G02F 2001/133354* (2013.01)

(56) References Cited

U.S. PATENT DOCUMENTS

| | | |
|---|---|---|
| 2001/0040648 A1 | 11/2001 | Ono et al. |
| 2003/0043326 A1 | 3/2003 | Sawasaki et al. |
| 2004/0070718 A1 | 4/2004 | Saigo et al. |
| 2004/0130897 A1 | 7/2004 | Kojima et al. |
| 2006/0118828 A1 | 6/2006 | Kim et al. |
| 2007/0225096 A1 | 9/2007 | Fujita |
| 2009/0040442 A1 | 2/2009 | Tanno et al. |
| 2009/0059141 A1 | 3/2009 | Nagasawa |
| 2010/0007838 A1 | 1/2010 | Fujimoto et al. |
| 2010/0201932 A1 | 8/2010 | Gotoh et al. |
| 2010/0253656 A1 | 10/2010 | Fujikawa |
| 2011/0058133 A1* | 3/2011 | Ishigaki ............ G02F 1/136227 349/138 |

FOREIGN PATENT DOCUMENTS

| | | |
|---|---|---|
| JP | 2009-271103 A | 11/2009 |
| TW | 201007316 A | 2/2010 |

OTHER PUBLICATIONS

Search Report dated Mar. 13, 2012 regarding a counterpart European patent application No. 11193409.7.

* cited by examiner

LIQUID CRYSTAL DISPLAY DEVICE

CROSS REFERENCE TO RELATED APPLICATION

This application is a continuation of U.S. patent application Ser. No. 14/056,545, filed on Oct. 17, 2013, which, in turn, is a continuation of U.S. patent application Ser. No. 13/311,595 (now U.S. Pat. No. 8,749,741), filed on Dec. 6, 2011, which claims the priority of Japanese Patent Application No. 2010-279155 filed on Dec. 15, 2010 in the Japanese Patent Office, the entire contents of which are incorporated herein by reference.

FIELD OF THE INVENTION

The present invention relates to a display device, and more particularly, to a liquid crystal display device designed to prevent peeling of a film formed on an organic passivation film.

BACKGROUND OF THE INVENTION

A liquid crystal display device includes a TFT substrate in which pixels each having a pixel electrode, a thin film transistor (TFT), and the like are arranged in a matrix form. Further, a counter substrate is disposed opposite to the TFT substrate, in which color filters and the like are formed at positions corresponding to the pixel electrodes of the TFT substrate. A liquid crystal is interposed between the TFT substrate and the counter substrate. Then, the light transmittance is controlled by liquid crystal molecules in each pixel to form an image.

The use of liquid crystal display devices is growing in various fields due to its flatness and lightweight. Small-sized liquid crystal display devices are widely used in mobile phones and digital still cameras (DSCs). In the liquid crystal display device, the viewing angle characteristics are a problem. The viewing angle is a phenomenon in which the brightness changes or the color changes between when the display is viewed from the front and when the display is viewed from an oblique direction. The viewing angle characteristics are excellent in the in-plane switching (IPS) mode for driving liquid crystal molecules by the electric field in the horizontal direction.

There are many different types of IPS mode. For example, a common electrode is formed in a planar shape, on which a pixel electrode having a slit is provided with an insulating film interposed therebetween, to rotate liquid crystal molecules by the electric field generated between the pixel electrode and the common electrode. This type can increase the light transmittance, and is now a mainstream IPS mode. An organic passivation film is used for flattening the base on which the common electrode is formed. However, the organic passivation film is highly hygroscopic and absorbs water from the air when it is left outside. Then, in the film formation, the water absorbed by the organic passivation film is released during heat treatment. This affects the film formed on the organic passivation film, causing it to peel off.

As a method to solve such a problem, JP-A No. 271103/2009 describes a configuration in which an interlayer insulating film is formed on an organic passivation film on an image signal line, and a through hole is formed along the image signal line in the interlayer insulating film to allow gas present in the organic passivation film to be released from the through hole. Further, in JP-A No. 271103/2009, the through hole is covered by a transparent electrode that is electrically connected to the common electrode.

In order to describe the problem in the related art, first the cross-sectional structure of an IPS liquid crystal display device will be described. FIG. 9 is a cross-sectional view showing the structure of a pixel portion of a display area 10 of the liquid crystal display device. Note that the cross-sectional view of FIG. 9 is an example of the basic structure, and does not correspond one-to-one to the figures such as FIG. 2 which is a top view of an embodiment of the present invention described below. As shown in FIG. 9, the liquid crystal display device to which the present invention is applied is a top-gate TFT using poly-Si for a semiconductor layer 103. In FIG. 9, a first base film 101 of SiN and a second base film 102 of $SiO_2$ are formed on a glass substrate 100 by chemical vapor deposition (CVD). The role of the first base film 101 and the second base film 102 is to prevent the semiconductor layer 103 from being contaminated with impurities from the glass substrate 100.

The semiconductor layer 103 is formed on the second base film 102. In order to form the semiconductor layer 103, a-Si film is formed on the second base film 102 by CVD, which is then converted into poly-Si film by laser annealing. Then, the poly-Si film is patterned by photolithography.

Agate insulating film 104 is formed on the semiconductor film. The gate insulating film 104 is $SiO_2$ film derived from tetraethyl orthosilicate (TEOS). This film is also formed by CVD. Then, a gate electrode 105 is formed on the gate insulating film 104. The gate electrode 105 is formed on the same layer as a scan signal 30 at the same time. For example, the gate electrode 105 is formed from MoW film. When it is necessary to reduce the resistance of the scan line 30, Al alloy is used.

The gate electrode 105 is patterned by photolithography. At the time of patterning, impurities such as phosphor or boron are doped in the poly-Si layer to form a source S or drain D in the poly-Si layer. Further, a lightly doped drain (LDD) layer is formed between a channel layer of the poly-Si layer, and the source S or drain D by using the photoresist in patterning the gate electrode 105.

Then, a first interlayer insulating film 106 is formed of $SiO_2$ so as to cover the gate electrode 105. The role of the first interlayer insulating film 106 is to provide electrical insulation between the gate line 105 and a source electrode 107. The source electrode 107 is formed on the first interlayer insulating film 106. The source electrode 107 is connected to the pixel electrode 112 through a contact hole 130. In FIG. 9, the source electrode 107 is made wide enough to cover the TFT. The drain D of the TFT is connected to the image signal line at a point not shown.

The source electrode 107 is formed on the same layer as the image signal line at the same time. In order to reduce the resistance, AlSi alloy is used for the source electrode 107 or the image signal line. In the AlSi alloy, hillock formation occurs or Al diffuses into other layers. In order to prevent such a phenomenon, AlSi is sandwiched by a barrier layer of MoW and a cap layer. Alternatively, Mow or MoCr may be used instead of using Al.

The source electrode 107 and the source S of the TFT are connected to each other through the contact hole 130 formed in the gate insulating film 104 and the first interlayer insulating film 106. An inorganic passivation film 108 is formed and covers the source electrode 107 so as to protect the entire TFT. Similarly to the first base film 101, the inorganic passivation film 108 is formed by CVD.

An organic passivation film 109 is formed so as to cover the inorganic passivation film 108. The organic passivation film 109 is formed of a photosensitive acrylic resin. Examples of the material of the organic passivation film, in addition to the acrylic resin, are a silicone resin, epoxy resin, and polyimide resin. The organic passivation film 109, which has a role of a flattening film, is made thick. The thickness of the organic passivation film 109 is 1 to 4 μm, and in most cases, about 2 μm.

The contact hole 130 is formed in the inorganic passivation film 108 and in the organic passivation film 109 to provide electrical continuity between a pixel electrode 110 and the source electrode 107. The photosensitive resin used as the organic passivation film 109 is applied and then exposed. In this way, only the portion exposed by light is dissolved with a specific developer. In other words, when the photosensitive resin is used, the formation of photoresist can be omitted. After the contact hole is formed in the organic passivation film 109, the organic passivation film 109 is annealed at about 230° C. Thus, the organic passivation film 109 is completed.

The organic passivation film 109 is dry etched using the resist as a mask, in order to form the contact hole in the inorganic passivation film 108. In this way, the contact hole 130 is formed to provide electrical continuity between the source electrode 107 and the pixel electrode 110.

The top surface of the organic passivation film 109 formed as described above is flat. Amorphous indium-tin-oxide (ITO) is deposited by sputtering on the top of the organic passivation film 109, and then patterned using photoresist. Then, the ITO is etched by sulfuric acid to pattern the common electrode 110. The common electrode 110 is formed in a planner shape, avoiding the contact hole 130. Then, the ITO is polycrystallized by annealing at 230° C. in order to reduce the electrical resistance. The common electrode 110 is formed of ITO which is a transparent electrode. The thickness of the common electrode 110 is, for example, 77 μm Then, a second interlayer insulating film 111 is formed by CVD so as to cover the common electrode 110. At this time, the temperature condition of CVD is about 230° C., which is called low temperature CVD. Then, the second interlayer insulating film 111 is patterned by photolithography process. In FIG. 9, the second interlayer insulating film 111 does not cover the side wall of the contact hole 130. However, it is also possible that the second interlayer insulating film 111 covers the side wall of the contact hole 130.

The other films, such as the first base film 101 and the inorganic passivation film 108 are formed by CVD at a temperature of 300° C. or more. In general, the higher the temperature at which a CVD film and the like is formed the greater the adhesion to the base film. However, the organic passivation film 109 has been formed below the second interlayer insulating film 111. Thus, the characteristics of the organic passivation film 109 may be changed when the temperature is 230° C. or higher. For this reason, the second interlayer insulting film 111 is formed by low temperature CVD. When the second interlayer insulating film 111 is formed by low temperature CVD, there is a problem with the adhesion of the organic passivation film 109 to the other film, in particular to the common electrode 110 or the second interlayer insulating film 111.

The pixel electrode 112 having a slit 115 is formed by sputtering the amorphous ITO on the second interlayer insulating film 111 through a photolithography process. The pixel electrode 112 is connected to the source electrode 107 through the contact hole 113. When a signal voltage is applied to the pixel electrode 112, electric field lines are generated between the common electrode 110 and the pixel electrode 112 through the slit 115. The electric field rotates the liquid crystal molecules 301, thereby controlling the transmittance of light from a backlight for each pixel to form an image. The pixel electrode 112 is formed of ITO which is a transparent conductive film. The thickness of the pixel electrode 112 is, for example, in the range of 40 nm to 70 nm. An oriented film 113 is formed so as to cover the pixel electrode 112.

A counter substrate 200 is provided with a liquid crystal layer 300 interposed between the TFT substrate 100 and the counter substrate 200. A color filter 201 is formed within the counter substrate 200. The color filter 201 includes color filters of red, green, and blue in each pixel to form a color image. A black matrix 202 is formed between the color filters 201 to increase the contrast of the image. Note that the black matrix 202 also has a role as a light shielding film of the TFT to prevent the photocurrent from flowing into the TFT.

An overcoat film 203 is formed so as to cover the color filters 201 and the black matrix 202. The surface of the color filters 201 and the black matrix 202 is rough. Thus, the surface is flattened by the overcoat film 203. The oriented film 113 is formed on the overcoat film 203 for the initial orientation of the liquid crystal molecules. Note that FIG. 2 shows the case of the IPS, so that a counter electrode is formed on the side of the TFT substrate 100 but not on the side of the counter substrate.

As shown in FIG. 9, in the case of the IPS, the conductive film is not formed inside the counter substrate 200. As a result, the potential of the counter substrate 200 becomes unstable. In addition, external electromagnetic noise enters the liquid crystal layer 300 and affects the image. These problems eliminate by forming an external conductive film 210 on the outside of the counter substrate 200. The external conductive film 210 is formed by sputtering the ITO which is the transparent conductive film.

As described above, the second interlayer insulating film formed on the organic passivation film is deposited by low temperature CVD at about 230° C. Thus, the adhesion of the second interlayer insulating film to the base film is low. The organic passivation film, which is formed below the second interlayer insulating film, absorbs water from the air when it is left outside. Then, when the organic passivation film is annealed to form various films on the organic passivation film, the water absorbed by the organic passivation film is released. At this time, the second interlayer insulating film peels off due to its low adhesion.

In order to solve the above problem, JP-A No. 271103/2009 describes a configuration in which a thin through hole is formed in the second interlayer insulating film and along the image signal line, so that the water absorbed by the organic passivation film is let out from the through hole. Further, in JP-A No. 271103/2009, the through hole is covered by the ITO film. The ITO film is electrically connected to the common electrode so as to have the shielding effect.

However, JP-A No. 271103/2009 has the following problem. That is, the second interlayer insulating film is formed by low temperature CVD, so that the film structure is less precise than the film structure formed by high temperature CVD. Thus, when the contact hole is formed along the image signal by etching, the width of the though hole is not stabilized because of the unstable etching rate. As a result, the through hole is very likely to reach the pixel electrode. When the through hole reaches the pixel electrode, the disturbance of the electric field occurs in this portion of the pixel electrode, in which the liquid crystal molecules may not be controlled adequately. As a result, light leakage or other failure occurs. In addition, when the through hole is covered by the ITO film electrically connected to the common electrode, the pixel electrode and the common electrode are electrically connected to each other. As a result, the pixel is faulty.

Another problem of JP-A No. 271103/2009 is that when the through hole is formed in the second interlayer insulating film, its effect is reduced by covering the through hole formed along the image signal line by the ITO. In other words, also when the pixel electrode of ITO is formed on the second interlayer insulating film, the ITO film is annealed at 230° C. to reduce the resistance of the ITO. At the same time, the oriented film is also annealed to be imidized. Thus, the water absorbed by the organic passivation film is released when the ITO and oriented films are formed. For this reason, it is necessary to effectively release the water from the through hole formed in the second interlayer insulating film.

SUMMARY OF THE INVENTION

The present invention is to solve the above problems, and to prevent the second insulating film from peeling off, without reducing the process latitude and without degrading the image quality.

The present invention overcomes the above problems. Concrete steps are as follows. There is provided an IPS liquid crystal display device that uses a top gate TFT as a switching element. The TFT uses poly-Si as a semiconductor layer. An inorganic passivation film and an organic passivation film are formed so as to cover the TFT. A common electrode is formed on the organic passivation film. An interlayer insulating film is formed on the common electrode. Then, a pixel electrode having a slit is formed on the interlayer insulating film.

The width of an image signal line is wide in the vicinity of the TFT, in which the image signal line is electrically connected to the drain or source portion of the TFT through a contact hole. In the wide portion of the image signal line, a through hole is formed in the interlayer insulating film formed on the common electrode. In this way, gas generated in the organic passivation films is released from the through hole. Because the through hole for gas release is formed in the wide portion of the image signal line, if the diameter of the through hole varies by etching, this will not affect the driving of the liquid crystal molecules. Further, the diameter of the through hole for gas release is greater than the diameter of the contact hole for providing the electrical connection between the image signal line and the source or drain portion. In addition, the through hole for gas release is not covered by the conductive film such as ITO. Thus, it is possible to effectively release the gas from the organic passivation film to the outside.

The above configuration can also be applied to the IPS of the type in which the pixel electrode is formed on the organic passivation film, on which the interlayer insulating film is formed, and then the common electrode having a slit is formed on the interlayer insulating film.

Further, it is possible that the through hole for gas release is formed in the interlayer insulating film covering the peripheral circuit formed in the vicinity of the display area. Or it is also possible to form the through hole for gas release in the interlayer insulating film covering the portion in which a testing element group (TEG) pattern or an alignment mark is formed in the vicinity of the terminal portion of the TFT substrate.

According to the present invention, it is possible to prevent the interlayer insulating film from peeling off. As a result, the production yield of the liquid crystal display device can be improved.

DETAILED DESCRIPTION OF THE PREFERRED EMBODIMENTS

Hereinafter, the present invention will be described in detail with reference to embodiments.

First Embodiment

Figure 1:
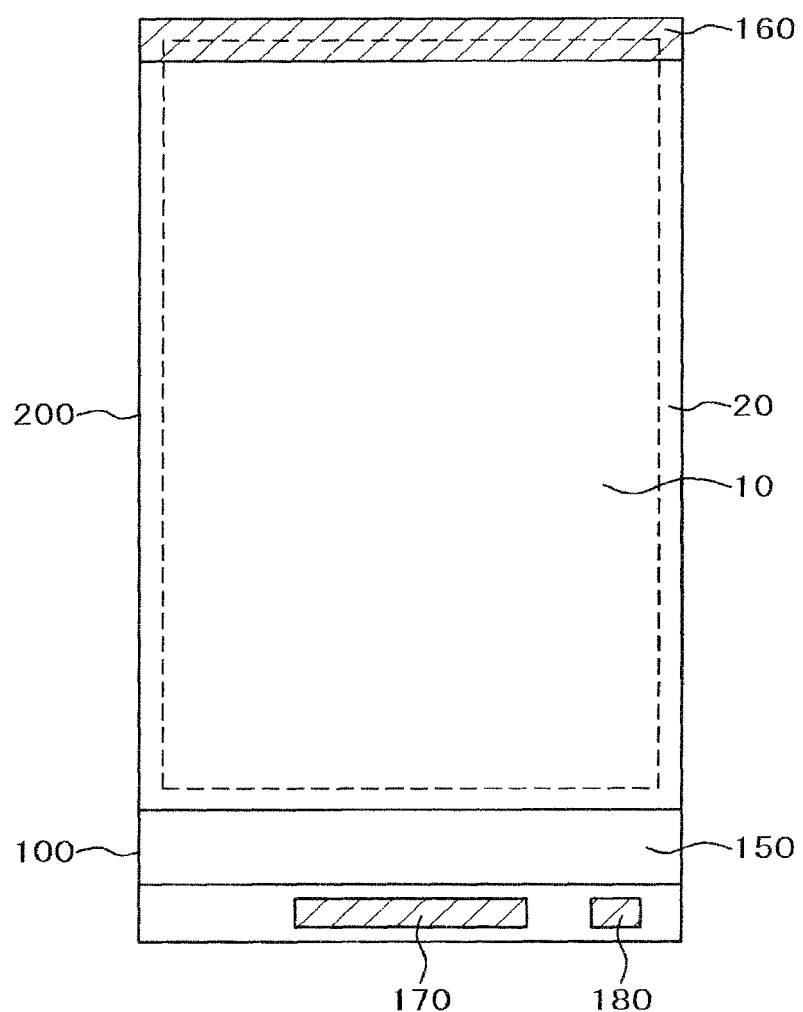
FIG. 1 is a top view of a liquid crystal display device.

FIG. 1 is a top view of a small liquid crystal display device used for portable electronic devices such as mobile phones, which is an example of the product to which the present invention is applied. In FIG. 1, a counter substrate 200 is provided on a TFT substrate 100. Although not shown, there is a liquid crystal layer interposed between the TFT substrate 100 and the counter substrate 200. The TFT substrate 100 and the counter substrate 200 are bonded together by a sealing material 20 formed around the frame. In FIG. 1, liquid crystal is injected between the substrates by a dropping method, so that no injection hole is formed.

The TFT substrate 100 is formed larger than the counter substrate 200. In a portion of the TFT substrate 100 extending beyond the counter substrate 200, a terminal portion 150 is formed to supply power, image signals, scan signals, and the like, to a liquid crystal cell 1. Further, on the outside of the terminal portion 150, there is formed a testing element group (TEG) used in the test of the circuit characteristics, or an alignment mark used in the alignment of the upper and lower boards in the production process.

Figure 2:
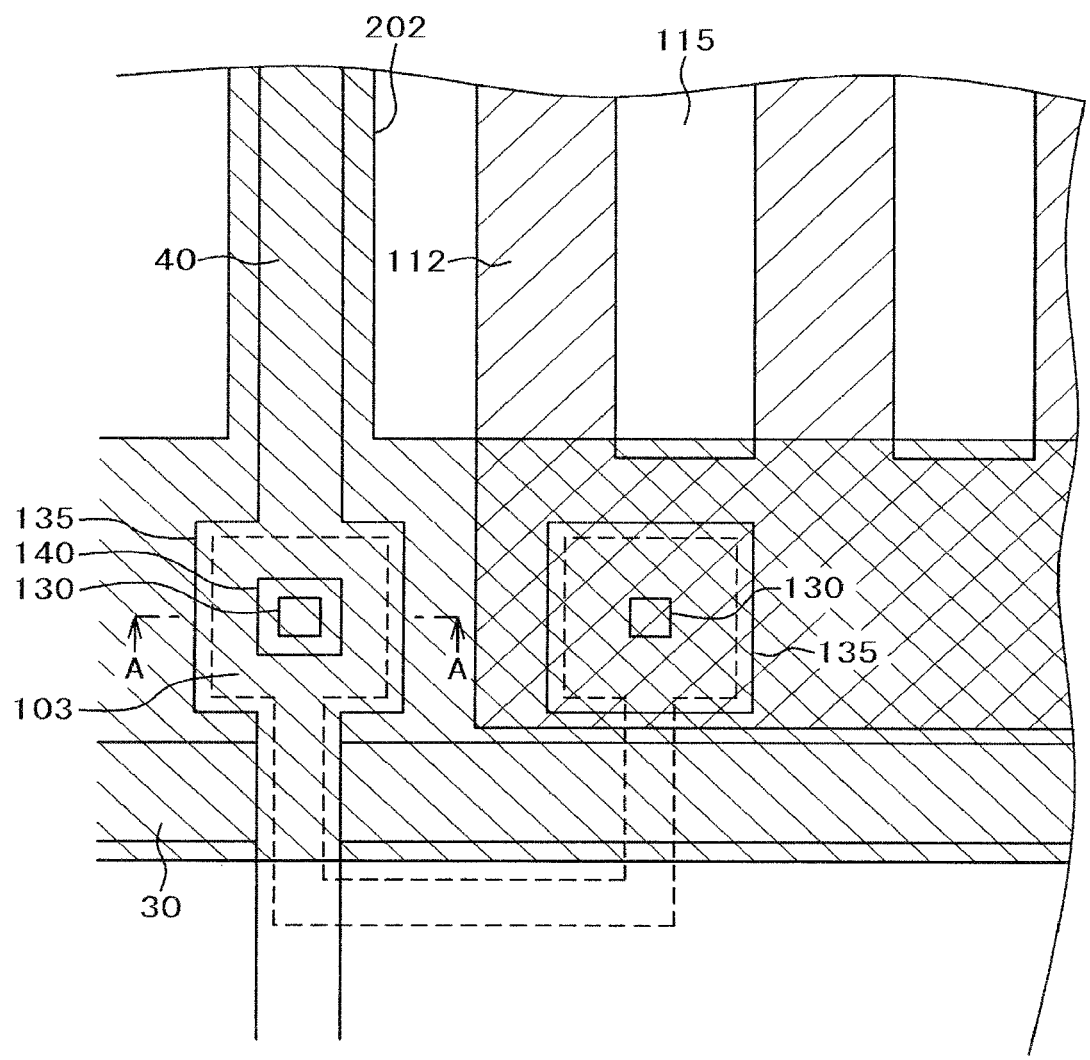
FIG. 2 is a top view of a pixel portion according to a first embodiment of the present invention.

FIG. 2 is a top view of the structure of a part of the pixel portion in the display area 10 shown in FIG. 1. In FIG. 2, the pixel electrode 112 having the slit 115 is formed in an area surrounded by an image signal line 40 and a scan line 30. A common electrode, not shown, is formed below the pixel electrode 112 through a second interlayer insulating film not shown. An image signal is supplied to the pixel electrode 112 from the image signal line 40 through TFT.

In FIG. 2, a first TFT and a second TFT are arranged in series from the image signal line 40 to the pixel electrode 112. In FIG. 2, a contact hole 130 is formed in a wide portion of the image signal line 40 to connect the semiconductor layer 103 with the image signal line 40. The semiconductor layer 103 extends beyond the scan line 30, and is folded across the scan line 30 once again to connect to the pixel electrode 112.

The semiconductor layer 103 includes a channel portion below the scan line 30 having a role as a gate electrode, in which a drain portion or a source portion is formed on either of the two sides of the scan line 30. In FIG. 2, for convenience, the side near the image signal line 40 is called the drain portion and the side near the pixel electrode 112 is called the source portion in each TFT. In other words, in the first TFT, the side connected to the image signal line 40 is the drain portion, and the side connected to the second TFT is the source portion, while in the second TFT, the side connected to the first TFT is the drain portion, and the side connected to the pixel electrode 112 is the source portion.

In FIG. 2, the scan line 30 also functions as the gate electrode. The channel portion of the semiconductor layer 103 is formed below the scan line 30. Thus, in FIG. 2, two TFTs are present between the image signal line 40 and the pixel electrode 112. In FIG. 2, a through hole 140 is also formed in the contact portion of the image signal line 40 and the semiconductor layer 103. The area of the through hole is greater than the area of the contact hole 130. The through hole 140 is used to release gas from an organic passivation film 109 not shown in FIG. 2.

In the counter substrate 200, there is formed a black matrix in the area shown in FIG. 2. The black matrix covers the image signal line 40, the scan line 30, the through hole 140, the contact hole 130, the channel portion of the TFT, and the like, formed on the TFT substrate 100 as described above.

Figure 3:
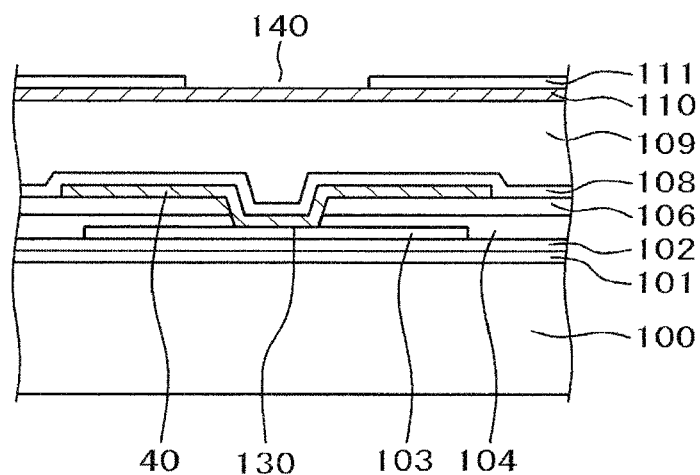
FIG. 3 is a cross-sectional view taken along line A-A in FIG. 2.

FIG. 3 is a cross-sectional view taken along line A-A in FIG. 2. The semiconductor layer 103 is formed on the first base film and on the second base film. A gate insulating film 104 and a first interlayer insulating film 106 are formed so as to cover the semiconductor layer 103, on which the image signal line 40 is formed. The image signal line 40 is connected to the semiconductor layer 103 through the contact hole 130 that is formed in the gate insulating film 104 and in the first interlayer insulating film 106. The inorganic passivation film 108 is formed so as to cover the image signal line 40 or the first interlayer insulating film 106. Then, the organic passivation film 109 is formed on the inorganic passivation film 108.

A common electrode 110 is formed on the organic passivation film 109. Then, a second interlayer insulating film 111 is formed on the common electrode 110. The second interlayer insulating film 111 provides electrical insulation between the common electrode 110 and the pixel electrode 112. However, the pixel electrode 112 is not present on the image signal line 40. In the present invention, the through hole 140 is formed in this area of the second interlayer insulating film 111 to be able to easily release water and the like absorbed by the organic passivation film 109. Note that the oriented film 113 is omitted in FIG. 3.

As shown in FIGS. 2 and 3, the diameter of the through hole 140 is grater than the diameter of the contact hole 130. This is in order to effectively release the gas absorbed by the organic passivation film 109. The portion in which the contact hole 130 is formed has a concave shape, so that peeling of the second interlayer insulating film 111 is more likely to occur. For this reason, it is effective to form the through hole 140 for gas release in this area.

As shown in FIG. 2, the portion in which the through hole 140 for gas release is formed is the wide portion of the image signal line 40, which also functions as a light shielding electrode 135. Thus, if a disturbance in the orientation of the liquid crystal molecules occurs due to the influence of the through hole 140 for gas release, light leakage will not occur in this portion.

The through hole 140 for gas release is formed by etching. The second interlayer insulating film 111 is formed by low temperature CVD, so that the dimension control in etching is more difficult than the case of the film formed by high temperature CVD. However, as shown in FIG. 2, the light shielding electrode 135 having a large area is formed below the through hole 140 for gas release. Thus, light leakage will not occur if the dimension of the through hole 140 for gas release varies.

Further, in FIG. 2, the through hole 140 for gas release is formed very close to the scan line 30. In the counter substrate 200, the black matrix 202 is formed in the portion corresponding to the scan line 30. Thus, even if light leakage occurs due to the influence of the through hole 140 for gas release, the light can also be blocked by the black matrix 202.

As described above, according to the present invention, the through hole 140 for gas release is formed in the vicinity of the scan line 30 and in the wide portion of the image signal line 40. Thus, it is possible to prevent peeling of the second interlayer insulating film 111. Further, the wide portion of the image signal line 40 also functions as the light shielding electrode 135, preventing side effects such as light leakage due to the formation of the through hole 140 for gas release.

Note that in the present invention, the through hole 140 for gas release formed in the second interlayer insulating film 111 is not covered by ITO. As a result, it is possible to release gas from the organic passivation film to the outside more effectively.

Second Embodiment

In an upper wiring circuit 160 corresponding to the shaded part above the display area 10 shown in FIG. 1, a portion of protective wiring circuits or drive circuits is formed. These protective circuits have a TFT. The inorganic passivation film 108 and the organic passivation film 109 are formed so as to cover the TFT, on which the common electrode 110 is formed. Then, the second interlayer insulating film 111 is formed so as to cover the common electrode 110. There is also a problem with the adhesion of the second interlayer insulating film 111, similar to the case of the display area 10 described in the first embodiment.

Figure 4:
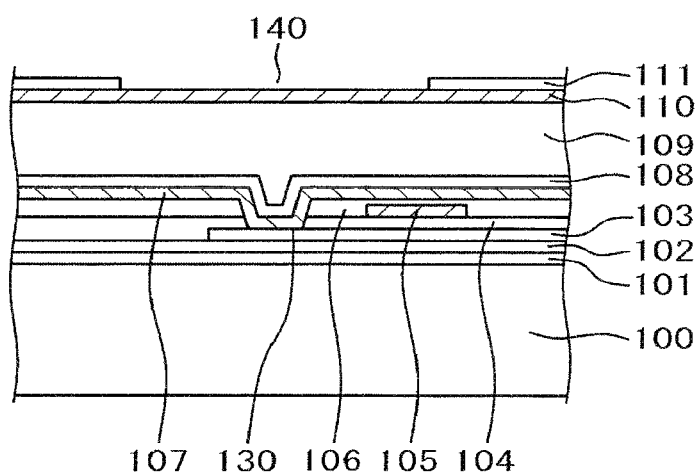
FIG. 4 is a cross-sectional view according to a second embodiment of the present invention.
Figure 9:
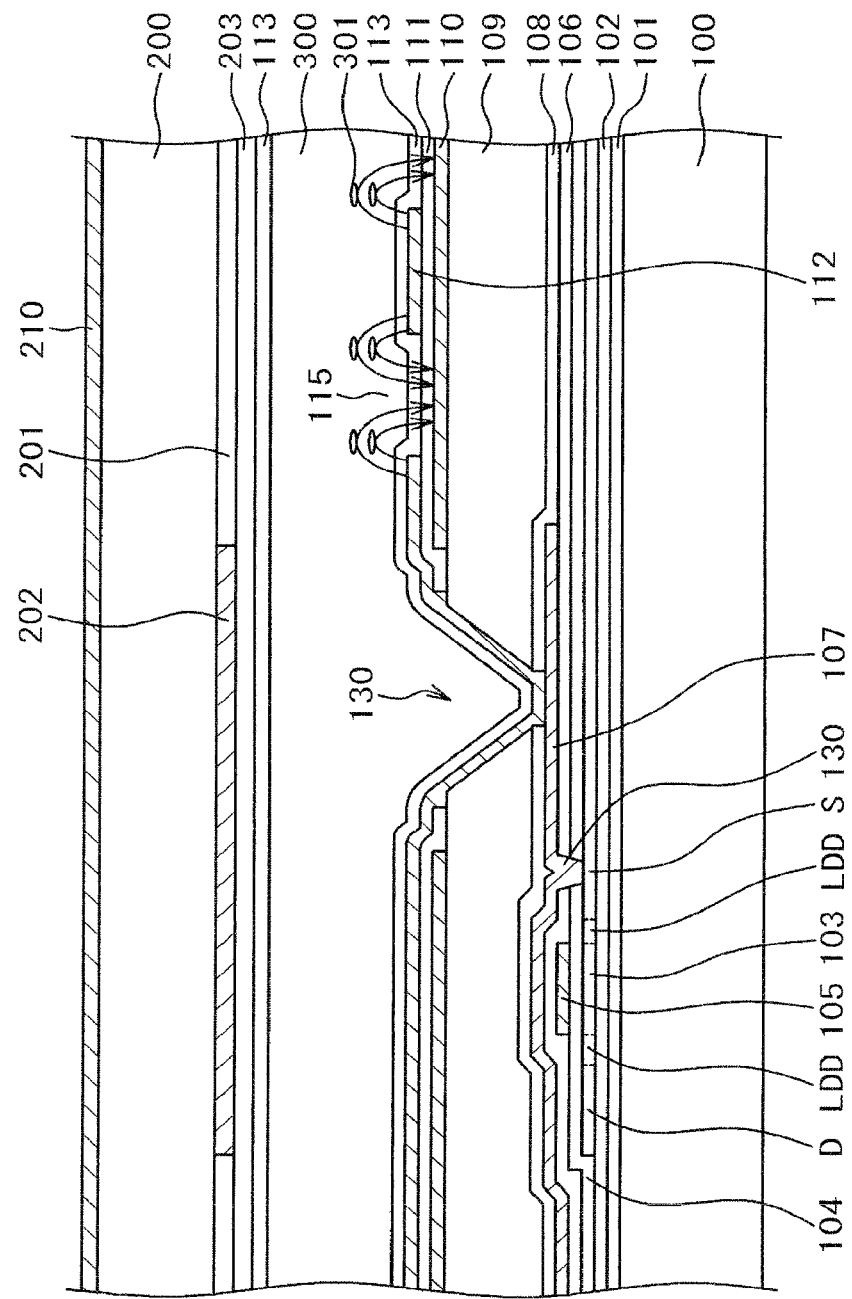
FIG. 9 is a cross-sectional view of the display area of the liquid crystal display device having a top-gate type TFT.

FIG. 4 is a cross-sectional view in the area in which the protective circuit and the like are formed. FIG. 4 is a view of the cross section including TFT. FIG. 4 is the same as that described with reference to FIG. 9, and so the details will be omitted here. In FIG. 4, the source electrode 107 or drain electrode is connected through the contact hole 130 formed in the gate insulating film 104 and in the first interlayer insulating film 106, both of which cover the semiconductor layer 103. The source electrode 107 or drain electrode is the line formed in the same layer as the image signal line 40. The inorganic passivation film 108 is formed so as to cover the source electrode 107 or drain electrode. Then, the organic passivation film 109 is formed on the inorganic passivation film 108.

On the inorganic passivation film 108, there is an electrode of ITO formed at the same time as the common electrode 110. This electrode is electrically connected to the common electrode 110, and will also be referred to as the common electrode 110. This common electrode 110 does not drive the liquid crystal molecules as in the case of FIG. 9, which serves as a simple connection line or a shield electrode. The second interlayer insulating film 111 is formed so as to cover the common electrode 110. The contact hole 130 is formed in the vicinity of the TFT, in which the adhesion of the second interlayer insulating film 111 is particularly low. Thus, the through hole 140 is formed in the corresponding portion of the second interlayer insulating film 111 to release gas from the organic passivation film 109.

In FIG. 4, the through hole 140 for gas release is formed on the outside of the display area 10, so that light leakage or other problems will not occur if the dimension of the through hole 140 for gas release somewhat varies. Thus, a relatively larger through hole can be made on the outside of the display area 10 than inside. As a result, it is possible to prevent peeling of the second interlayer insulating film 111 more surely. Note that also in this embodiment, the through hole 140 for gas release formed in the second interlayer insulating film 111 is not covered by ITO. Thus, it is possible to release gas from the organic passivation film to the outside more effectively.

Third Embodiment

In the liquid crystal display device to which the present invention is applied, the TFT is formed of poly-Si, in which a drive circuit can be mounted within the liquid crystal display panel. When the drive circuit is formed within the liquid crystal display panel, it is necessary to check the change in the circuit characteristics during the process. For this reason, as shown in FIG. 1, a testing element group (TEG) 170 is formed on the outside of the terminal portion 150. The characteristics of the TFT and the like are checked by the TEG 170. Thus, the TEG 170 should also have the same structure as the display area 10 or the drive circuit portion.

Figure 5:
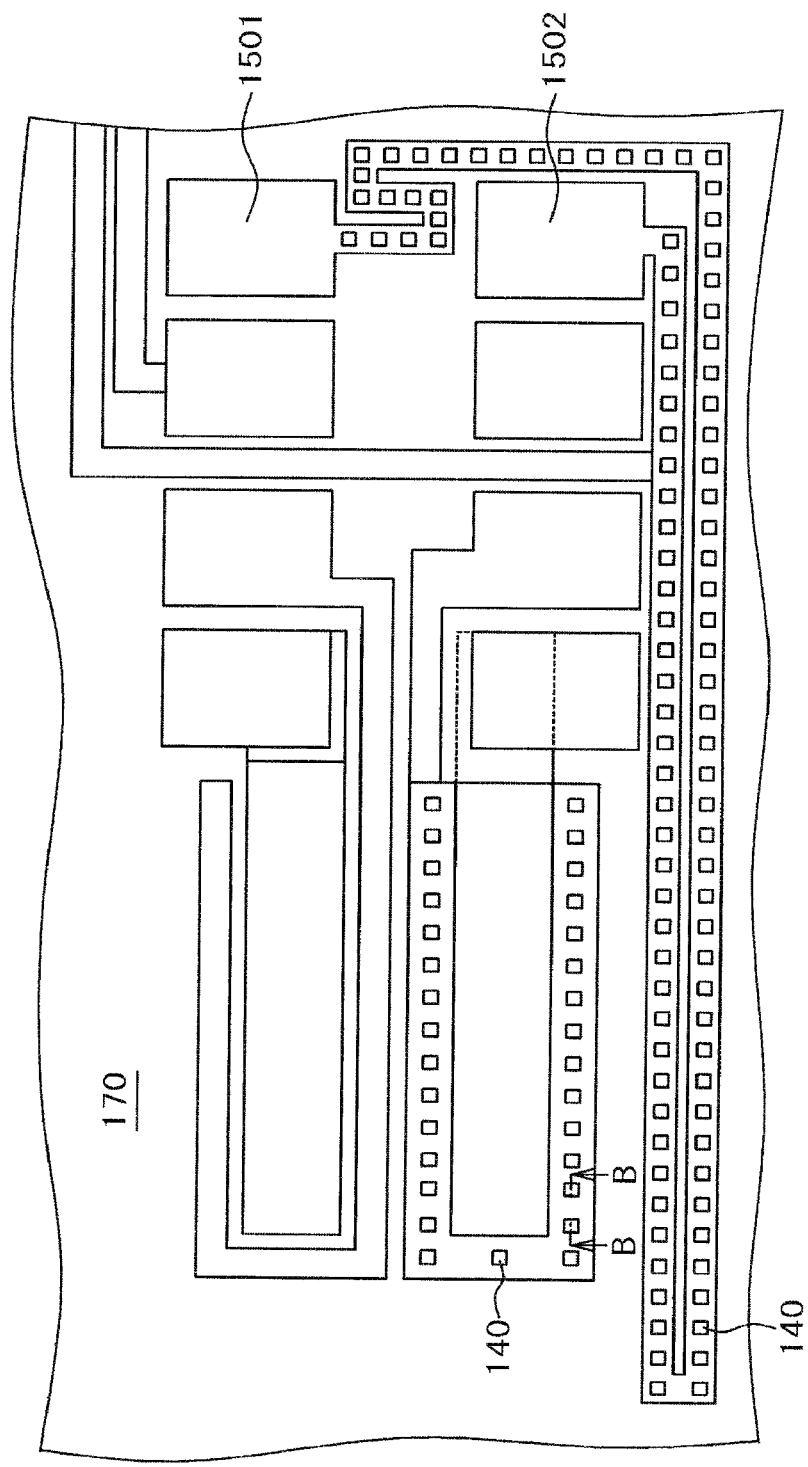
FIG. 5 is a top view showing an example in which the present invention is applied to the TEG pattern portion.

Also in the TEG 170, the common electrode 110 of ITO is formed on the organic passivation film 109. Then, the second interlayer insulating film 111 is present on the common electrode 110. This is the same as in the display area 10 and the like. FIG. 5 is an example of the TEG 170, in which a long resistance is formed between terminals 1501 and 1502 to measure the resistance formed by the common electrode 110. Although not shown, the second interlayer insulating film 111 is formed on this long resistance. The common electrode 110 is formed on the organic passivation film 109. When the water is released from the organic passivation film 109, the second interlayer insulating film 111 peels off, and it is no longer able to function as the TEG 170. In this embodiment, as shown in FIG. 5, a large number of rectangular through holes 140 for gas release are formed to allow gas to be easily released from the organic passivation film 109. In this way, the second insulating film 111 is prevented from peeling off.

Figure 6:
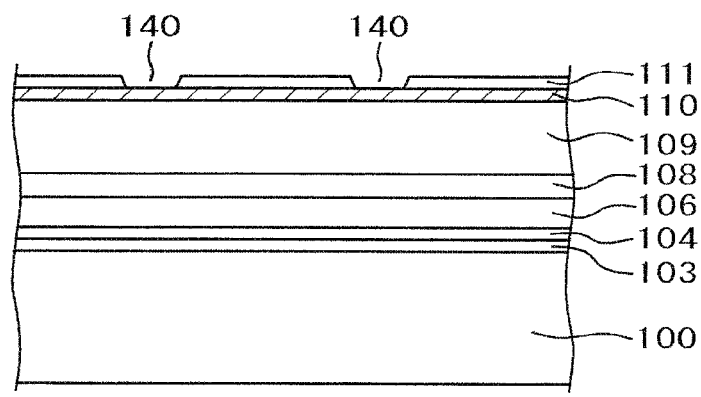
FIG. 6 is a cross-sectional view taken along line B-B in FIG. 5.

FIG. 6 is a cross-sectional view taken along line B-B in FIG. 5. The first and second base films are omitted in FIG. 6. FIG. 6 shows that the semiconductor layer 103, the gate insulating film 104, the first interlayer insulating film 106, the inorganic passivation film 108, and the organic passivation film 109 are laminated in this order from the bottom. Then, the common electrode 110 is formed on the organic passivation film 109. The second interlayer insulating film 111 is formed on the common electrode 110. The through holes 140 for gas release are formed in the second interlayer insulating film 111, in order that the water and the like can be easily released from the organic passivation film 109. As a result, the second interlayer insulating film 111 is prevented from peeling off.

The manufacturing process of liquid crystal display devices is as follows. A mother board is formed by bonding a mother TFT board in which a large number of the TFT substrates 100 are formed, to a mother counter board in which a large number of the counter substrates 200 are formed. Then, individual liquid crystal display panels are cut out of the mother board by scribing or other method. When the mother TFT substrate and the mother counter substrate are bonded together by a sealing material, it is necessary to use the alignment mark 180.

Figure 7:
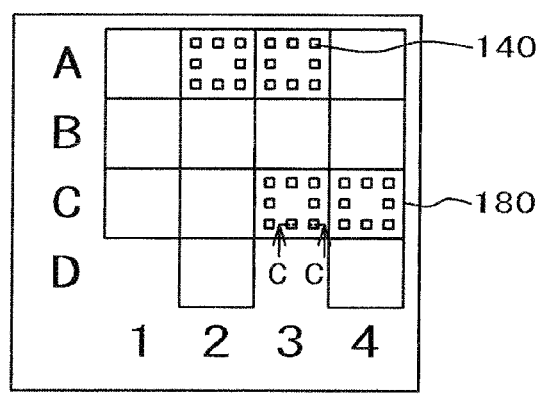
FIG. 7 is a top view showing an example in which the present invention is applied to the alignment mark portion.

FIG. 7 is an example of an alignment mark 180. In FIG. 7, the alignment mark 180 is formed by combining square units. The rectangular through holes 140 for gas release are present in some of the units of the alignment mark 180. The through holes 140 are formed in the second interlayer insulating film 111. The through holes 140 for gas release allow the water and the like absorbed by the organic passivation film 109 to be easily released. As a result, the second interlayer insulating film 111 is prevented from peeling off.

Figure 8:
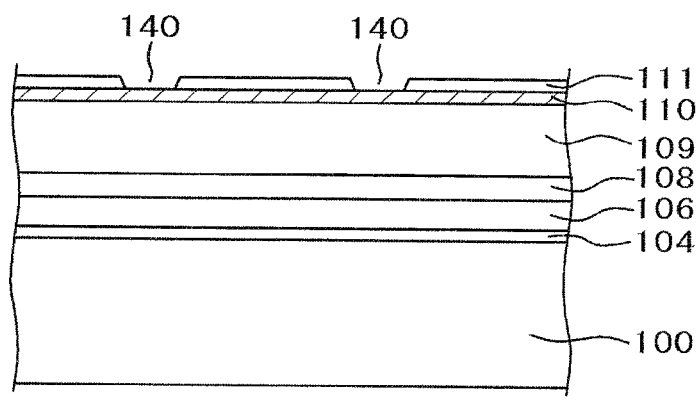
FIG. 8 is a cross-sectional view taken along line C-C in FIG. 7.

FIG. 8 is a cross-sectional view taken along line C-C in FIG. 7. The configuration of FIG. 8 is the same as that described with reference to FIG. 6, except that the semiconductor layer 103 is not present. Thus, the description thereof will be omitted. Note that FIG. 6 or FIG. 8 is an example of the cross section. It does not necessarily mean that the semiconductor layer 103 is typically present in FIG. 6, and that the semiconductor layer 103 is typically not present in FIG. 8.

As described above, when the organic passivation film 109 and the second interlayer insulating film 111 are also formed in the area other than the area in which the liquid crystal is injected in the liquid crystal display panel, the through holes 140 for gas release are also formed in this area of the second interlayer insulating film 111, to be able to function as the TEG 170 or the alignment mark 180 without fail. However, the TEG 170 or the alignment mark 180 shown in FIG. 1 is not used after the liquid crystal display device is completed. Thus, the portion of the TEG 170 or the alignment mark 180 is often removed in the scribing process. Note that also in this embodiment, the through hole 140 for gas release formed in the second interlayer insulating film is not covered by ITO. Thus, it is possible to release gas from the organic passivation film to the outside more effectively.

In the above examples, the IPS is the type in which the common electrode 110 is formed on the organic passivation film 109, on which the pixel electrode 112 having the slit 115 is formed through the second interlayer insulating film 111. However, the present invention can also be applied in the same way to the other types of IPS in which the pixel electrode 112 is formed on the organic passivation film 109, on which the common electrode having the slit 115 is provided through the interlayer insulating film 111.

What is claimed is:
1. A display device comprising:
   a scan line extending in a first direction,
   an image signal line extending in a second direction,
   a TFT includes a semiconductor layer and a gate electrode;
   an organic layer formed above the semiconductor layer;
   a first transparent conductive layer formed above the organic layer;
   an inorganic insulating layer formed above the first transparent conductive layer; and
   a second transparent conductive layer formed above the inorganic insulating layer;

wherein the TFT includes a first TFT and a second TFT,
wherein the first TFT has a drain portion connected to the image signal line through a contact hole,
wherein the second TFT is connected to the first TFT and has a source portion connected to the second conductive layer,
wherein the scan line also functions as the gate electrodes of the first TFT and the second TFT,
wherein the second conductive layer is supplied with an image signal from the image signal line through the source portion,
wherein a through hole is formed in the inorganic insulating layer and overlapped with the contact hole, and
wherein the through hole is not covered by the second transparent conductive layer.

2. The display device according to claim 1,
wherein the second conductive layer is surrounded by the scan line and the image signal line.

3. The display device according to claim 1,
wherein the semiconductor layer having a channel portion, a drain portion, and a source portion, and
wherein the gate electrode is formed opposite to the channel portion.

4. The display device according to claim 3,
wherein the image signal line having a first width,
wherein the image signal line having a first portion where width is wider than the first width,
wherein the drain portion of the TFT is connected to the image signal lines at the first portion of the image signal line through the contact hole.

5. The display device according to claim 4,
wherein a diameter of the through hole is greater than a diameter of the contact hole.

6. The display device according to claim 1,
wherein the first transparent conductive layer is a common electrode, and the second transparent conductive layer is a pixel electrode.

7. A display device comprising:
a display area that includes a TFT;
a peripheral area having a semiconductor layer;
an organic layer formed above the semiconductor layer;
a first transparent conductive layer formed above the organic layer;
an inorganic insulting layer formed above the first transparent conductive layer; and
a second transparent conductive layer formed above the inorganic insulating layer;
wherein a through hole is formed in the inorganic insulating layer,
wherein the through hole is not covered by the second transparent conductive layer,
wherein the through hole is exposed to the first transparent conductive layer, and
wherein the first conductive layer and the second conductive layer are not connected via the through hole.

8. The display device according to claim 7,
wherein the semiconductor layer having a channel portion, a drain portion, and a source portion, and
wherein the gate electrode is formed opposite to the channel portion.

9. The display device according to claim 7,
wherein a first interlayer insulating layer is formed between the semiconductor layer and the organic layer,
wherein a metal layer is formed above the first interlayer insulating layer, and
wherein the metal layer is connected to the drain portion or the source portion through a contact hole formed in the first interlayer insulating layer.

10. The display device according to claim 7,
wherein a diameter of the through hole is greater than a diameter of the contact hole.

* * * * *